UNITED STATES PATENT OFFICE 2,692,900

PRODUCTION OF BENZENE HEXACHLORIDE

William E. Bissinger, Akron, Ohio, assignor, by mesne assignments, to Columbia-Southern Chemical Corporation, Pittsburgh, Pa., a corporation of Delaware No Drawing. Application February 8, 1950,
Serial No. 143,147

7 Claims. (Cl. 260—648)

This invention relates to the preparation of benzene hexachloride, and it has particular relation to the preparation of benzene hexachloride under conditions which will not darken the benzene hexachloride thereby produced.

It is known that benzene hexachloride may be prepared by reaction of benzene with chlorine in the absence of a chlorination substitution catalyst, such as ferric or aluminum chloride. This reaction may be facilitated by actinic light and/or by employing organic peroxides as a catalyst, such as described in a co-pending application, Serial No. 15,487, filed March 17, 1948, of William E. Bissinger and Franklin Strain, and now abandoned. Actinic light may be defined as light, the wave length of which is from 2500 to 4500 Angstrom units, or at least above the visible range, in frequency. It may also be defined as light which produces chemical change.

Several methods of preparing benzene hexachloride may be used. According to one such method, chlorine gas is reacted with an excess of benzene at or near room temperature, while irradiating the mixture with actinic light. According to a further method, benzene and liquid chlorine may be reacted at a temperature and pressure such as to maintain the chlorine in the liquid state. Temperatures which have been used in the latter method have usually been from 0° C. to minus 33.7° C. Actinic light is generally used to promote the reaction, although the reaction using liquid chlorine is reported to proceed even in the dark.

At least five isomeric forms of benzene hexachloride are produced by conventional addition chlorination processes. These isomers have been designated as alpha, beta, gamma, delta, and epsilon isomers. For certain purposes, such as in the insecticidal field, it is conventionally recognized that a high content of the gamma isomer is desirable.

In the methods set forth above for producing benzene hexachloride, and in most methods of producing benzene hexachloride by reacting chlorine with benzene, it is necessary to separate the product, benzene hexachloride, from the reaction mixture. Usually present, with the solid benzene hexachloride product, are benzene, and chlorinated benzenes, such as monochlorobenzene and dichlorobenzene. One objectionable feature of the presence of these compounds is that they render the product much more difficult to grind to a pulverulent particle size. These compounds lower the melting point of the product and this causes plugging in the grinder. These agents or impurities may be removed from the benzene hexachloride by heating the reaction mixture or by heating crude benzene hexachloride after separation from the reaction mixture.

One undesirable feature, however, of this method of recovering benzene hexachloride in a substantially pure state, is that the product tends to discolor when the reaction mixture of the crude benzene hexachloride is heated. When liquid chlorine is employed in the production of benzene hexachloride the discoloring often appears at temperatures even as low as 50° C. and in other processes the color of the product usually will have begun to turn black after a temperature of about 100° C. has been reached. Such discoloration is highly undesirable, and is believed to be due to the presence of certain impurities, possibly metallic compounds.

In accordance with the present invention, a novel process for preparing benzene hexachloride as a white, highly pure, pulverulent product has been discovered. It has been found that the impurities may be removed from benzene hexachloride by heating benzene hexachloride in the presence of a phosphorus compound of the type hereinafter set forth. Most effective results are obtained by reacting chlorine in the elemental state with benzene, in the presence of the phosphorus compound and thereafter subjecting the resulting benzene hexachloride to the above purification process. This reaction may be conducted conveniently by bubbling gaseous chlorine through liquid benzene containing such phosphorus compound, at a convenience temperature, usually below 60° C., for example room temperature or below, or by reacting benzene with liquid chlorine or by other method. It is desirable that the phosphorus compound be present during part, and preferably all, of the chlorination reaction in order to prevent discoloration during the purification step; however color improvement may also be attained by adding the phosphorus compound after chlorination but before heating of the reaction slurry. It is essential in order that such undesirable color formation be prevented, that the reaction mixture or slurrry containing the phosphorus compound be thoroughly agitated.

The following compounds of phosphorus are contemplated in the invention as being useful in the prevention of discoloring of benzene hexachloride during purification by heating:

Phosphoryl chloride, phosphorus pentachloride, and phosphorus oxides, such as phosphorus trioxide, phosphorus tetraoxide and phosphorus pentoxide, prevent darkening, as well as do the hydrates of these phosphorus oxides, such as phosphorous acid and ortho-, meta-, and pyrophosphoric acid. When these hydrates are employed they are usually present as aqueous solutions containing any convenient amount, for example about 80 to 100 percent by weight, of the hydrate. The term "phosphorus oxide" is intended to include the phosphorus oxides set forth above, and aqueous solutions and hydrates thereof. While aqueous solutions of phosphoric acid are suitable for use, they tend to cause corrosion when metallic reactors are used. Hence, anhydrous materials normally are used in such a case.

The reaction may be conducted simply by mixing benzene with gaseous or liquid chlorine. This process may be performed at various temperatures. When liquid chlorine is used, the temperature usually is below 20° C., for example, about 0° C. to minus 33° C. Not infrequently, the reaction is performed by mixing liquid benzene with liquid chlorine at the temperature at which chlorine remains liquid, and allowing the mixture to stand under chlorine reflux.

Alternatively, a solution of chlorine in inert solvents, such as carbon tetrachloride, or similar solvent, may be placed in a reactor and liquid benzene may be added from time to time, or continuously, to the chlorine solution. In this case, the phosphorus compound may be dissolved or dispersed in the liquid chlorine or chlorine solution, or it may be dispersed in the benzene which is added to the chlorine. Moreover the temperature of reaction may be maintained higher although usually not above 60° C.

Although actinic light has been found a very satisfactory means of activating the reaction between chlorine and benzene, chemical catalysts may be adapted to the process to obtain a benzene hexachloride of satisfactory gamma isomer content. Such catalysts may supplement or even completely replace actinic radiation.

Various peroxydicarbonate esters having the probable structure.

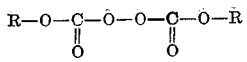

which may be prepared by reacting sodium peroxide with a chloroformate in aqueous media, usually at 0° to 10° C., may be employed in this manner. These esters may be regarded as esters of the hypothetical peroxydicarbonic acid having the probable structure:

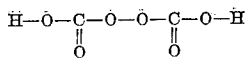

They normally are liquids or white solids which are soluble in organic solvents, such as methyl or ethyl alcohol.

Typical peroxydicarbonates useful for this purpose include the peroxydicarbonate esters of ethyl alcohol, isopropyl alcohol, n-propyl alcohol, cyclohexyl alcohol, ethylene glycol, allyl alcohol, 2-nitropropanol, phenol, ethyl lactate, benzyl alcohol, cresol, toluol, ethyl salicylate, and corresponding esters of other alcohols or compounds which contain a hydroxy group which is esterified by acids. Such hydroxy compounds rarely contain over 20 carbon atoms, and generally contain no more than 10 carbon atoms.

Other catalysts include organic peroxides, such as benzoyl peroxide, acetyl peroxide, tertiary butyl peroxide, etc. It has also been found that a small amount of water seems to aid in providing satisfactory results, especially when phosphoryl chloride and phopshorus pentachloride are employed.

When catalysts are used, they are added periodically or continuously to the mixture, frequently with the benzene as a benzene solution. Usually a catalyst concentration of 0.01 to 1 percent of catalyst, based upon the weight of benzene, is suitable.

In performance of the invention, benzene hexachloride is produced as described above, in the presence or absence of phosphorus compounds. The crude benzene hexachloride product is present as a solution in the unreacted benzene and/or as a solid suspended in the liquid reaction mixture. Also present in the reaction mixture are chlorine, benzene, and various chlorinated benzenes. The final benzene hexachloride product may be obtained from this reaction mixture by heating the reaction mixture in the presence of the phosphorus compound which may be added before chlorination is initiated or any time thereafter. The heating is carried out at temperatures sufficient to vaporize part or all of the impurities present in the benzene hexachloride product. Usually temperatures above 100° C. and up to 200° C. are employed to drive out all the impurities from the product, although higher temperatures below decomposition temperatures are permissible. This heating may be carried out at atmospheric pressure, or at pressures below atmospheric pressure. Following the heating operation, the molten product is cooled to crystallize solid benzene hexachloride using conventional flaking or crystallization processes.

The amount of phosphorus compound which is sufficient to eliminate the tendency of the benzene hexachloride product to discolor during purification by heating the crude product or the reaction mixture containing the product is quite small. In fact, even traces have been observed to eliminate the discoloring. For most purposes, it has been found that 0.01 to 0.25 percent of phosphorus compound, based upon the weight of benzene hexachloride produced, is satisfactory. Excessively large amounts of the phosphorus compounds do not appear to be desirable since charring of the product tends to occur.

The following examples clearly point out the advantage of the use of a phosphorus compound in the above described procedures. Examples I and III set forth the results when phosphorus pentoxide is used, and Examples II and IV illustrate the difficulties involved in attempting to obtain a white, non-contaminated product of benzene hexachloride without use of a phosphorus compound of the type contemplated in the invention and set forth above. Examples V and VI show further embodiments of the invention.

*Example I*

A 500-cubic centimeter round-bottom, three-necked flask was fitted with a water-cooled condenser, an electrically driven, ground glass, sealed, propeller-type glass stirrer, and an elongated connection which served as a chlorine inlet tube and an entrance for a minus 100° C. to 50° C. thermometer. The apparatus above the liquid level of the reaction was covered with aluminum foil, and the reaction mixture was irradiated with a 400-watt mercury vapor lamp placed 24 inches from the reaction flask.

Three moles (235 grams) of benzene and 0.16–0.19 gram of phosphorus pentoxide were added to the reaction flask. Chlorine gas addition was begun from a cylinder when the benzene was warmed to 40° C. and the light reached full intensity. The chlorine was added at a rate of 0.72 gram per minute. The stirred reaction mixture was maintained at 40° C. throughout the chlorine addition by intermittent cooling with an ice water bath. After 91 minutes, when 65.5 grams (0.92 mole) of chlorine, sufficient for a 10.5 percent benzene conversion, had been introduced, solids began to appear, and the chlorine addition was discontinued but irradiation was continued for an additional 30 minutes.

The resultant reaction mixture was then heated to 139° C. in two hours, without stirring. A colorless solution was present throughout the heating except towards the end when, at a temperature of 123° C., a light yellow color developed and remained thus, up to 139° C. By the time a temperature of 123° C. was reached, almost all of the distillate (98 percent) was collected. The final benzene recovery was 95 percent of the excess used. The residue was allowed to stand overnight and most of it crystallized to a white solid leaving only a small amount of yellow oil, probably a solution of benzene hexachloride in benzene or chlorinated benzenes. The solid was dried in a vacuum desiccator, and the weight of the dried benzene hexachloride was 90.2 grams. The benzene hexachloride thus produced was white and undiscolored.

*Example II*

The same apparatus and procedure were used as in Example I, with the exception that no phosphorus pentoxide was added. During the distillation of the excess benzene, different results were obtained. When a temperature of 88° C. was reached during the heating, the solution became yellow. At this temperature, only 44 percent of the distillate had passed over. The color of the residue then became progressively darker until, at 140° C., it was black. The residue was allowed to stand overnight, and was then treated as in Example I. The color of the benzene hexachloride product was dark grey, almost black.

*Example III*

A 500-cubic centimeter round-bottom, three-necked flask was fitted with a large cold finger condenser, and an electrically cone-driven, sealed, propellor-type glass stirrer. A Dry Ice trap was attached to the condenser. The entire apparatus was wrapped with aluminum foil, except for a hole of approximately two inches in diameter on the side of the flask. A 400-watt mercury vapor lamp was placed in a horizontal position 24 inches from the hole in the foil.

Five hundred twenty-five grams (7.44 moles) of liquid chlorine, 0.27 gram (0.0019 mole) of powdered phosphorus pentoxide, and 79 grams (1.01 moles) of benzene were mixed in the reaction flask. The total volume of solution was 425 cubic centimeters. The reactants were exposed to the lamp at full intensity for four hours, and then irradiation was discontinued. The slurry was left overnight to permit escape of gaseous components.

The resultant reaction mixture was heated in an oil bath at 130° C. for 3.5 hours with intermittent stirring. The color of the mixture was white at the end of the heating. The mixture was allowed to cool, whereupon it crystallized to a waxy, white solid.

*Example IV*

The same apparatus and procedure were employed as in Example III, with the exception that no phosphorus pentoxide was used in the reaction. The reaction mixture, upon being heated to 130° C. in an oil bath, turned black within 20 minutes and remained black throughout the 3.5 hours of heating. The final product was black.

*Example V*

The same apparatus was employed as used in Example I. Two and two-tenths moles (172 grams) of benzene were placed in the reaction flask and 1.32 moles (94 grams) of chlorine were slowly added to the benzene while maintaining the temperature at about 20° C. When about 20 percent of the benzene had been converted to benzene hexachloride, and after chlorination had been discontinued, 0.20 gram of phosphorus pentoxide were added to the reaction mixture and the excess benzene was distilled off. The product was then heated to a temperature of about 140° C. The benzene hexachloride thus produced was a white solid.

*Example VI*

Forty gallons of benzene and 100 milliliters of an aqueous solution of phosphoric acid containing 85 percent by weight of phosphoric acid were placed in a nickel kettle and stirred at a temperature of 20° C. until thoroughly mixed. The contents of the kettle were irradiated with a 400-watt mercury vapor lamp. Chlorine was then added at a uniform rate during irradiation and over a period of 8 hours in amount sufficient to convert approximately 28 percent of the benzene to benzene hexachloride at a temperature of 20° C.

After the addition of the chlorine, the excess benzene was distilled off, and the product was then heated to 140° C. at a final pressure of 80 millimeters. The benzene hexachloride thus produced was a white solid.

Although the present invention has been described with respect to the specific details of certain embodiments, such details shall not be regarded as limiting the scope of the invention except insofar as included in the accompanying claims.

I claim:

1. A method of purifying benzene hexachloride contaminated with impurities present incident to the production thereof by additive chlorination of benzene with chlorine, which comprises agitating and heating the benzene hexachloride to vaporize impurities therefrom in the presence of a small amount of a phosphorus oxide.

2. A method of purifying benzene hexachloride contaminated with impurities present incident to the production thereof by additive chlorination of benzene with chlorine, which comprises agitating and heating the benzene hexachloride to vaporize impurities therefrom in the presence of a small amount of phosphoric acid.

3. A method of purifying benzene hexachloride contaminated with impurities present incident to the production thereof by additive chlorination of benzene with chlorine, which comprises agitating and heating the benzene hexachloride to vaporize impurities therefrom in the presence of a small amount of phosphoryl chloride.

4. A method of purifying benzene hexachloride contaminated with impurities present incident to the production thereof by additive chlorination of benzene with chlorine, which comprises agitating and heating the benzene hexachloride to vaporize impurities therefrom in the presence of a small amount of phosphorus pentachloride.

5. A method of purifying benzene hexachloride contaminated with impurities incident to the production thereof by additive chlorination of benzene with chlorine, which comprises agitating and heating benzene hexachloride to vaporize impurities therefrom in the presence of a small amount of a compound selected from the group consisting of phosphoryl chloride, phosphorus pentachloride, phosphorus oxides and hydrates thereof.

6. A method of producing benzene hexachloride which comprises reacting chlorine with an amount of benzene in excess of that theoretically required to react with chlorine under conditions conducive to the production of benzene hexachloride whereby to produce a benzene hexachloride solution, adding a small amount of a compound selected from the group consisting of phosphoryl chloride, phosphorus pentachloride, phosphorus oxides and hydrates thereof to the solution, agitating the compound-containing solution, and heating the agitated compound-containing solution to a temperature and for a time sufficient to drive off substantially all of the excess benzene.

7. A method of producing benzene hexachloride which comprises reacting chlorine with an amount of benzene in excess of that required to react with chlorine under conditions conducive to the production of benzene hexachloride whereby to produce a benzene hexachloride solution, performing said reaction while agitating the reactants in the presence of a compound selected from the group consisting of phosphoryl chloride, phosphorus pentachloride, phosphorus oxides and hydrates thereof, and then heating the solution to a temperature and for a time sufficient to drive off substantially all of the excess benzene.

References Cited in the file of this patent

UNITED STATES PATENTS

| Number | Name | Date |
|---|---|---|
| 2,010,841 | Bender | Aug. 13, 1935 |

FOREIGN PATENTS

| Number | Country | Date |
|---|---|---|
| 613,519 | Great Britain | Nov. 30, 1948 |

OTHER REFERENCES

Groggins, "Unit Processes in Organic Synthesis," third edition, page 168 (1947).